United States Patent
Schmitt et al.

(10) Patent No.: US 6,864,655 B2
(45) Date of Patent: Mar. 8, 2005

(54) RAIN SENSOR, IN PARTICULAR FOR A MOTOR VEHICLE HAVING A WINDOW-WIPER DEVICE, AND METHOD FOR CONTROLLING A WINDSHIELD-WIPER DEVICE

(75) Inventors: Patrick Schmitt, Lichtenau (DE); Bruno Hodapp, Achern-Oensbach (DE); Hans Meier, Ottersweier (DE); Henry Blitzke, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/624,853

(22) Filed: Jul. 21, 2003

(65) Prior Publication Data
US 2004/0051492 A1 Mar. 18, 2004

(30) Foreign Application Priority Data
Sep. 13, 2002 (DE) ......................................... 102 42 688

(51) Int. Cl.$^7$ ................................................. H02P 1/06
(52) U.S. Cl. ...................... 318/443; 318/445; 318/483; 318/282; 318/286; 15/250.12; 15/250.17
(58) Field of Search ................................ 318/282–286, 318/443, 445, 483, DIG. 2; 15/250.12, 250.17

(56) References Cited

U.S. PATENT DOCUMENTS

| | | | | |
|---|---|---|---|---|
| 5,017,847 A | * | 5/1991 | Leistenschneider | 318/443 |
| 5,672,946 A | * | 9/1997 | Kawashima et al. | 318/444 |
| 5,780,719 A | * | 7/1998 | VanDam | 73/29.01 |

FOREIGN PATENT DOCUMENTS

DE      197 23 859      12/1998

* cited by examiner

Primary Examiner—Rina Duda
(74) Attorney, Agent, or Firm—Kenyon & Kenyon

(57) ABSTRACT

A rain sensor, in particular for a motor vehicle including a window-wiper device (windshield-wiper device), including a measuring element, which has a sensitivity that is predefinable by a control device, a signal, characterizing the speed of the motor vehicle, being able to be transmitted to the control device, and the control device increasing the sensitivity of the measuring element at lower speed. Furthermore, a method for controlling a windshield-wiper device, in particular for a motor vehicle. A measuring element is connected to a control device, its sensitivity being predefined by the control device. A signal characterizing a speed of the motor vehicle is transmitted to the control device and the sensitivity of the measuring element increased at lower speed.

10 Claims, 2 Drawing Sheets

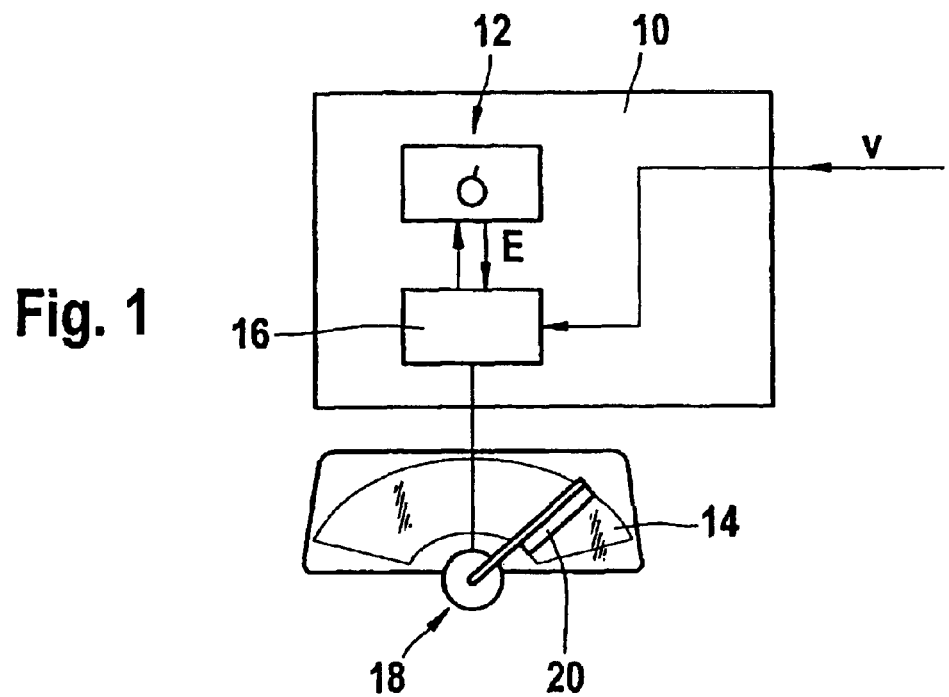
Fig. 1
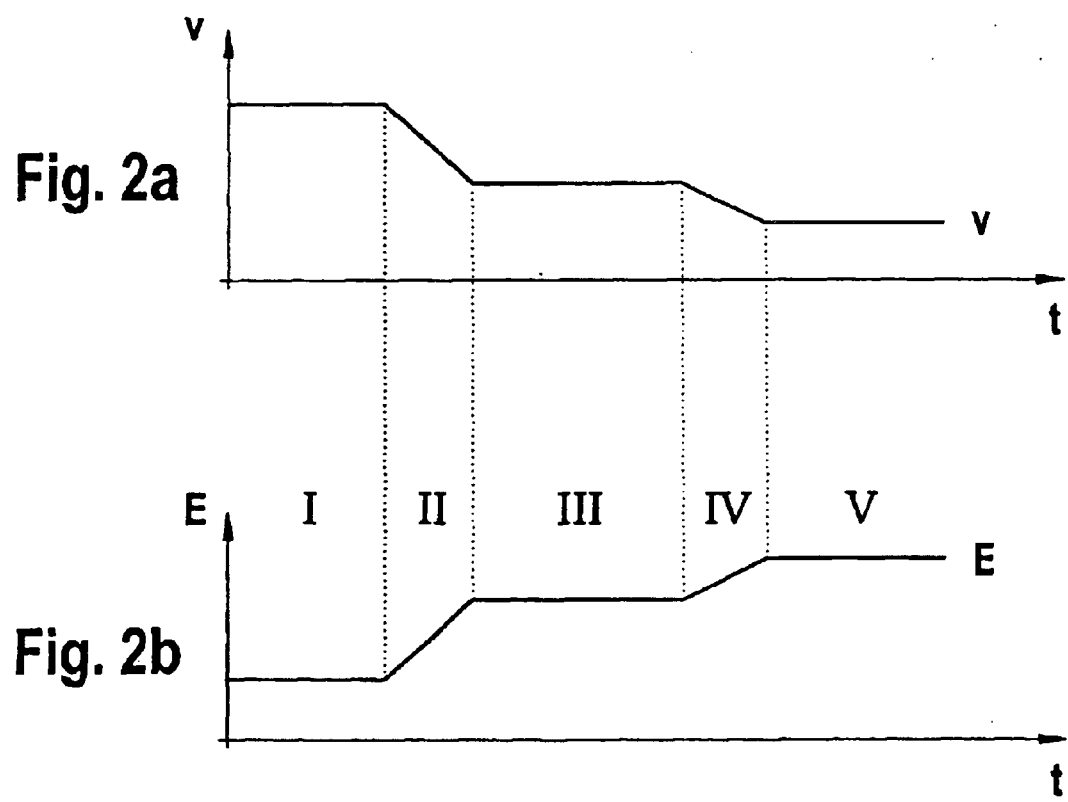
Fig. 2a
Fig. 2b

RAIN SENSOR, IN PARTICULAR FOR A MOTOR VEHICLE HAVING A WINDOW-WIPER DEVICE, AND METHOD FOR CONTROLLING A WINDSHIELD-WIPER DEVICE

FIELD OF THE INVENTION

The present invention relates to a rain sensor, in particular for a motor vehicle including a window-wiper device (windshield-wiper device), and to a method for controlling a windshield-wiper device.

BACKGROUND INFORMATION

There are believed to be rain sensors for motor vehicles including windshield-wiper devices. These devices including a measuring element, which has a sensitivity that is predefinable by a control device. For instance, German Published Patent Application No. 197 23 859 refers to a rain sensor in which day and night may be distinguished with the aid of a photocell and the triggering sensitivity of the rain sensor is controlled. Furthermore, the sensitivity of the measuring element of the rain sensor may be varied as a function of the detected signal, and, thus, the rain intensity.

SUMMARY OF THE INVENTION

The rain sensor according to the present invention may provide that the sensitivity of the measuring element of the rain sensor is controllable as a function of the motor vehicle speed, and that a higher sensitivity of the measuring element may be adjusted, especially at lower speeds. In this manner, the subjective sensitivity of the rain sensor may be improved, since the airstream, at lower speeds, does not bring about an effect that may allow the drops to break up.

The sensitivity may be increased when the speed is very low, especially below 5 km/h or even less than 3 km/h. In this case, the sensitivity is already increased when, for example, the car is driven at very low speed in stalled traffic or at a traffic light, thereby resulting in an improved wiping characteristic.

If the control device has a single wiping stage in which a single wiping cycle may be activated in each case, and if the sensitivity is increased in this operating step, a wiping performance results that adapts in a particularly sensitive manner.

The control device may increase the sensitivity in those instances when a longer period of time, specifically at least 5 seconds, has elapsed since the last wiping cycle. In this manner, a build-up on the window during longer wiping intervals is prevented in an especially effective manner.

The exemplary method according to the present invention may provide that a signal characterizing the speed is transmitted to the control device and the sensitivity of the measuring element is increased at low speed. In this manner, a sensitivity is attained that is subjectively more even.

An increase in the sensitivity when the speed is low, in particular less than 5 km/h or even less than 3 km/h, prevents a disruptive "build-up" on the window at lower speeds. When the windshield-wiper device implements single wiping cycles and increases the sensitivity between the single wiping cycles, the wiping performance is effectively improved for the driver.

The sensitivity may be increased once a longer time interval of, in particular, at least 5 seconds has elapsed since the last wiping cycle, in order to always have a clean window available when the rain quantities are low and the vehicle is stopped at a traffic light or caught in backed-up traffic.

BRIEF DESCRIPTION OF THE DRAWINGS

FIG. 1 shows a schematic representation of a rain sensor according to the present invention.

FIG. 2a shows an example of a speed characteristic curve above the time.

FIG. 2b shows a sensitivity profile over the time, corresponding to FIG. 2a.

FIG. 3b shows the wiping activity over the time, in a profile according to FIG. 3a.

FIG. 3c shows the sensitivity over the time corresponding to a speed profile from FIG. 3a.

DETAILED DESCRIPTION

Figure 3A:
FIG. 3a shows an example of a speed profile over the time.

In a schematic representation, FIG. 1 shows a rain sensor 10 configured according to an exemplary embodiment of the present invention. It includes a measuring element 12, which is able to detect moisture on a window 14, in particular the windshield of a motor vehicle. Measuring element 12 is connected to a control device 16, which is also connected to a speedometer device (not shown here). This speedometer device transmits to control device 16 a signal characterizing speed v of the motor vehicle. Furthermore, control device 16 is connected to a windshield-wiper device 18, which includes at least one windshield wiper 20, which swipes across window 14 during operation and squeezes moisture off this window. Typically, measuring element 12 is arranged in the region of window 14 across which wiper 20 swipes.

According to the exemplary embodiment of the present invention, control device 16 is configured or arranged such that a transmitting diode couples light into window 14, which, on a dry window, is totally reflected and focused onto a receiver, . . . sensitivity E of measuring element 12 is able to be predefined. In the case of optical sensors, this may be implemented, for instance, in that the transmitting capacity of the transmitting diode is increased, or the temperature sensitivity, i.e., the follow-up speed of the reference value, is slowed to compensate for temperature-dependent signal changes.

FIG. 2a shows a speed characteristic curve above the time by manner of example, with the proviso that signal v is proportional to the vehicle speed. Correspondingly to the speed characteristic curve of FIG. 2a, FIG. 2b plots sensitivity E of measuring element 12. In a first range I, the speed remains constant and sensitivity E is therefore constant as well. In a second range II, the speed drops and sensitivity E of measuring element 12 rises correspondingly. In a third range, the speed is constant again, but lower than in the first range. Correspondingly, sensitivity E of measuring element 12 is constant in the third range and at a higher level than in the first range. For the fourth range, the same applies as for the second range, the same as for the first and third range holds for the fifth range, but here the speed is at an even lower level, so that sensitivity E attains a maximum value as well.

Figure 3B:
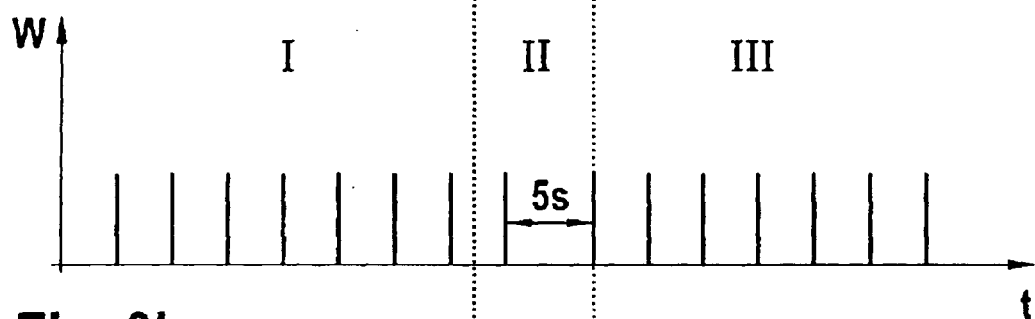
Figure 3C:
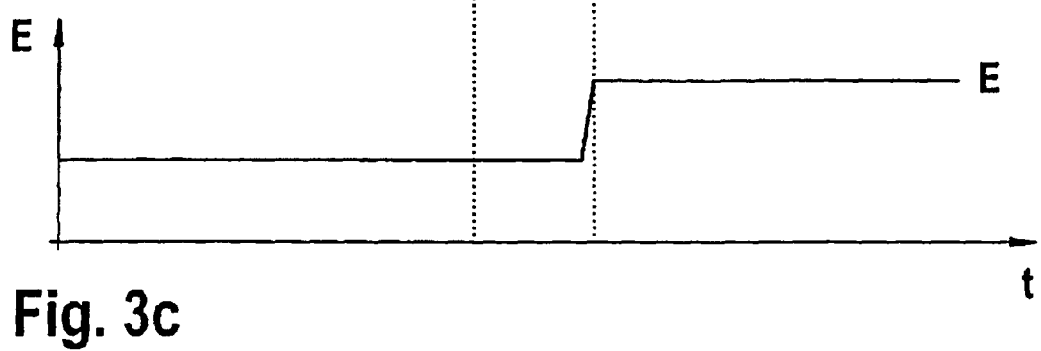

FIG. 3a shows the speed profile above the time by manner of example. In FIG. 3b, the wiping activity of windshield wiper 20 is drawn in above the time, each peak representing a performed wiping cycle. FIG. 3c shows sensitivity E above the time.

In a first range I, the motor vehicle drives at a speed v1, subsequently slows down, but then continues at a speed v2, whereupon it again slows down somewhat until coming to a standstill. During this entire time, the wiping activity remains basically constant. A new wiping cycle is triggered every three seconds, for example. The reason for this is that, due to the airstream, moisture droplets continually appear in the detection area of measuring element 12, thereby regularly triggering wiping cycles. In second range II, the motor vehicle is at rest. Since moisture droplets from the airstream no longer drift into the region of measuring element 12, a longer wiping interval occurs, for instance of approximately 5 seconds. Control device 16 thereupon increases the sensitivity (E), as may be seen in FIG. 3c. In this third range III, sensitivity E is increased to such a degree that the wiping activity corresponds roughly to the wiping activity of first range I. In this manner, the driver obtains a more even wiping profile.

What is claimed is:

1. A rain sensor for a motor vehicle including a wiper device, the rain sensor comprising:

a control device; and a measuring element having a sensitivity that is predefinable by the control device;

wherein a signal characterizing a speed of the motor vehicle is transmittable to the control device, and wherein the control device increases the sensitivity of the measuring element at a lower speed;

wherein the control device has a single wiping stage in which a single wiping cycle is activatable in each case, and the sensitivity of the measuring element is increased in the single wiping cycle; and wherein the control device increases the sensitivity of the measuring element when a longer time interval has elapsed since a last wiping cycle.

2. The rain sensor of claim 1, wherein the control device increases the sensitivity when the speed is low.

3. The rain sensor of claim 1, wherein the control device increases the sensitivity when the speed is less than 5 km/h.

4. The rain sensor of claim 1, wherein the control device increases the sensitivity when the speed is less than 3 km/h.

5. The rain sensor of claim 1, wherein the longer time interval is at least 5 seconds.

6. A method for controlling a window-wiper device for a motor vehicle including a measuring element that has a sensitivity predefined by a control device, the method comprising:

transmitting a signal characterizing a speed of the motor vehicle to the control device; and increasing the sensitivity of the measuring element at lower speed;

wherein the windshield-wiper device implements single wiping cycles and the sensitivity of the measuring element is increased between the single wiping cycles; and wherein the sensitivity of the measuring element is increased when a longer time interval has elapsed since the last wiping cycle.

7. The method of claim 6, wherein the sensitivity of the measuring element is increased when the speed is low.

8. The method of claim 6, wherein the sensitivity of the measuring element is increased when the speed is less than 5 km/h.

9. The method of claim 6, wherein the sensitivity of the measuring element is increased when the speed is less than 3 km/h.

10. The method of claim 6, wherein the longer time interval is at least 5 seconds.

* * * * *